US012573711B2

(12) United States Patent
Heidenbauer et al.

(10) Patent No.: US 12,573,711 B2
(45) Date of Patent: Mar. 10, 2026

(54) AUTOMOTIVE BATTERY WITH GAS DEFLECTION ELEMENTS

(71) Applicant: MAGNA STEYR Fahrzeugtechnik GmbH & Co KG, Graz (AT)

(72) Inventors: Oliver Heidenbauer, Koeflach (AT); Bernhard Koss, Graz (AT); Heimo Kreimaier, Graz (AT)

(73) Assignee: MAGNA STEYR Fahrzeugtechnik GmbH & Co KG, Graz (AT)

( * ) Notice: Subject to any disclaimer, the term of this patent is extended or adjusted under 35 U.S.C. 154(b) by 523 days.

(21) Appl. No.: 18/162,511

(22) Filed: Jan. 31, 2023

(65) Prior Publication Data

US 2023/0253670 A1 Aug. 10, 2023

(51) Int. Cl.
| | |
|---|---|
| *H01M 50/35* | (2021.01) |
| *H01M 10/613* | (2014.01) |
| *H01M 10/625* | (2014.01) |
| *H01M 10/6554* | (2014.01) |
| *H01M 10/6561* | (2014.01) |

(52) U.S. Cl.
CPC ......... *H01M 50/35* (2021.01); *H01M 10/613* (2015.04); *H01M 10/625* (2015.04); *H01M 10/6554* (2015.04); *H01M 10/6561* (2015.04); *H01M 2220/20* (2013.01)

(58) Field of Classification Search
CPC .. H01M 50/35; H01M 10/613; H01M 10/625; H01M 10/6554; H01M 10/6561; H01M 2220/20; H01M 50/358; H01M 50/367; H01M 50/211; H01M 50/244; H01M 50/249; H01M 50/584; Y02E 60/10
See application file for complete search history.

(56) References Cited

U.S. PATENT DOCUMENTS

| | | | | |
|---|---|---|---|---|
| 11,283,121 | B1 * | 3/2022 | Boecker | H01M 50/249 |
| 2002/0187390 | A1 * | 12/2002 | Kimoto | H01M 10/613 |
| | | | | 429/82 |
| 2011/0135975 | A1 * | 6/2011 | Fuhr | H01M 50/249 |
| | | | | 429/88 |
| 2012/0164490 | A1 * | 6/2012 | Itoi | H01M 50/358 |
| | | | | 429/82 |
| 2013/0095356 | A1 * | 4/2013 | Shimizu | H01M 50/519 |
| | | | | 429/88 |
| 2014/0045007 | A1 * | 2/2014 | Fritz | H01M 50/325 |
| | | | | 429/82 |

(Continued)

FOREIGN PATENT DOCUMENTS

| | | | | |
|---|---|---|---|---|
| DE | 102012219379 A1 * | 4/2014 | | H01M 50/317 |
| DE | 102020001540 A1 | 9/2021 | | |
| EP | 2626922 A1 * | 8/2013 | | H01M 50/107 |

OTHER PUBLICATIONS

Translation DE 102012219379 (Year: 2012).*

(Continued)

*Primary Examiner* — Robert W Hodge
(74) *Attorney, Agent, or Firm* — Jordan IP Law, LLC; Todd A. Vaughn

(57) ABSTRACT

A motor vehicle including a battery which includes a plurality of battery cells, a frame component having at least one hollow profile with a plurality of intake apertures, and a plurality of gas-discharging elements arranged on the plurality of battery cells to guide a flow of gas from the battery cells through the intake apertures into the hollow profile.

20 Claims, 6 Drawing Sheets

(56)     References Cited

U.S. PATENT DOCUMENTS

| | | | |
|---|---|---|---|
| 2015/0072184 A1* | 3/2015 | Kusunoki ........... | H01M 50/394 |
| | | | 429/54 |
| 2016/0218336 A1* | 7/2016 | Herrmann ........... | H01M 50/367 |
| 2016/0308179 A1 | 10/2016 | Lohr et al. | |
| 2019/0067659 A1 | 2/2019 | Karulkar et al. | |
| 2022/0223972 A1* | 7/2022 | Zhu .................... | H01M 50/367 |

OTHER PUBLICATIONS

Translation DE 1020200001540 (Year: 2020).*
European Search Report for Application No. 22156046.9, mailed Aug. 23, 2022, 4 pages.

* cited by examiner

AUTOMOTIVE BATTERY WITH GAS DEFLECTION ELEMENTS

CROSS-REFERENCE TO RELATED APPLICATIONS

The present application claims priority 35 U.S.C. § 119 to European Patent Publication No. EP 22156046.9 (filed on Feb. 10, 2022), which is hereby incorporated by reference in its entirety.

TECHNICAL FIELD

Embodiments relate to a motor vehicle including a battery which comprises a plurality of battery cells.

BACKGROUND

It is known that motor vehicles, in particular those with electric drives and hybrid drives, carry high-voltage batteries for providing the necessary drive energy. The batteries are typically constructed from a plurality of battery cells, for instance from so-called pouch cells which are flat and which exhibit a flexible plastic sheath.

It is known that in a high-voltage battery a thermal event may occur, in the course of which a battery cell overheats and emits gas (venting). It is problematic that such an event in a single cell may spread to adjacent cells and that a thermal propagation may occur. Meaning, due to an overheating of many contiguous battery cells, the heat can spread out to neighbouring cells, to a significant extent via the emerging hot gas, so that these cells, in turn, emit gas. This leads to situations that may become critical for the occupants.

SUMMARY

Embodiments are operable to improve motor vehicles having batteries with many battery cells, so that the safety of the battery is enhanced and, in particular, the risk of a thermal propagation is reduced.

Such embodiments relate to a motor vehicle including a battery which comprises a plurality of battery cells, the motor vehicle including at least one hollow profile, the hollow profile exhibiting a plurality of intake apertures, and a plurality of gas-discharging elements having been arranged on the plurality of battery cells in such a way that gas emerging from the battery cells is conducted by the gas-discharging elements into the intake apertures of the hollow profile.

In accordance with embodiments, in a motor vehicle having a battery with many individual battery cells the hot stream of gas is purposefully discharged in the case of an outgassing of least one cell, so that the neighbouring or surrounding cells are protected from the hot emerging gas and are damaged less or not at all, in particular, are not heated. The discharge is affected into the cavity of a hollow profile, in particular, into a frame component of the motor vehicle, such as a sill and/or side member and/or cross member, and/or into at least one other component additionally arranged in the vehicle and exhibiting a cavity. The discharge is affected into the frame or into the profile via gas-discharging elements along the hollow profile at several or many points, and via the hollow profile preferably to outlet apertures of the hollow profile. The gas-discharging elements conduct the gas purposefully away from the individual battery cells to the intake apertures of the hollow profile.

By virtue of the discharge of the gas, the electrically conductive particles contained in the emerging gas of a cell can also be prevented from causing a contamination of the battery space or of the cell region, and consequently from causing electrical short circuits in conductive components.

Preferably, there are substantially equally many gas-discharging elements as there are intake apertures in the hollow profile, and/or substantially at least equally many gas-discharging elements as there are battery cells, and/or substantially equally many, twice as many or four times as many gas-discharging elements as there are battery cells. Consequently, for substantially each battery cell precisely one gas-discharging element or two or four gas-discharging elements has/have preferably been provided. The discharge of the outflowing gas of a battery cell is preferably affected in each instance through a duct which is formed between two neighbouring gas-discharging elements. The duct conducts the gas, preferably from a battery cell, purposefully to an intake aperture on the hollow profile. Substantially one gas-discharging element or at least one gas-discharging element has preferably been provided on each battery-cell side (on the left or on the right) for each battery cell. In the case of arrangement of the gas-discharging elements between the battery cells, two gas-discharging elements are required for one battery cell (in each instance on the left or on the right) for the purpose of forming a gas-discharging duct. In the case of arrangement of the gas-discharging elements approximately in the middle of the battery cells, three gas-discharging elements (in each instance on the left or on the right of the battery cell) are required for the purpose of forming the two gas-discharging ducts required for the purpose of outgassing a battery cell.

The dissipating of the thermal energy of the venting gas when a thermal event arises in a cell of a high-voltage battery is preferably affected within the scope of a cell-to-chassis concept, that is to say, a direct incorporation of the battery cells within the motor vehicle. The dissipation of thermal energy or venting gases is preferably affected through the vehicle-frame structure, for instance through at least one sill. The conduction of the venting gases from the cell into the vehicle-frame structure, for instance the sill, is affected by means of gas-discharging elements as gas-routing components, which preferentially transmit only a slight load to the cells in the event of a crash.

In a cell-to-chassis vehicle concept, cells are incorporated directly into the vehicle, individually or preferably in groups. This concept is also designated as "cell-to-car", "cell-to-vehicle", as well as "structural battery." Various types of cell exhibit various possible points at which they can emit gas in the case of a thermal event, in which connection pouch cells do not exhibit a well-defined preferential direction. Venting gases emerging from all these possible outgassing points in the pouch cell should preferably be conducted away from the cell into the exterior space of the motor vehicle. This is affected in a manner directed by the gas-discharging elements, and not somewhere or other in free space. In this way, the cells next to the first outgassing cell are heated up less and so are brought into the state of thermal propagation only later (or not at all). The discharge is preferably affected not into lateral profiles of a battery pack but rather in ducts realised in hollow profiles, preferably in the vehicle frame. The venting gases are preferably conducted into a rear region of the motor vehicle and are let off there to the outside.

The gas-discharging elements preferably extend substantially completely from the battery cells as far as the intake apertures.

The gas-discharging elements have preferentially been arranged and/or designed in such a way that gas emerging from the battery cells is conducted by the gas-discharging elements into the intake apertures of the hollow profile in a specified direction, so that the evacuation of the gas in the direction of the longitudinal extent of the hollow profile is facilitated. For this purpose, an angle between a respective gas-discharging element and the hollow profile in the region of the intake aperture is preferably less than 70 degrees, preferably less than 50 degrees, so that the gas already enters the hollow profile approximately in its further direction of flow.

The gas-discharging elements are preferably of curved or rectilinear or bent design in their extent from the battery cells as far as the intake apertures.

The number of gas-discharging elements and intake apertures preferably corresponds substantially to the number of battery cells, or substantially to half the number of battery cells, or substantially to twice the number of battery cells—for instance, when gas-discharging elements have been arranged on both sides of the battery cells.

The gas-discharging elements have preferentially been arranged substantially parallel to one another, and ducts for routing escaping gas to the intake apertures are formed between each two gas-discharging elements.

At each of the intake apertures a barrier, in particular, a flap, a semipermeable membrane or thermally destructible material, has preferably been set up which enables the passage of gas emerging from a battery cell into the hollow profile and impedes the passage of gas out of the hollow profile to a gas-discharging element, in particular to another gas-discharging element and/or to a gas-discharging duct, in particular to another gas-discharging duct, that is to say, where the intake of gas has not taken place. The "impeding" includes the possibility that the intake of gas is prevented entirely. The barrier may have been constructed in such a manner that, although gas is able to enter the hollow profile from a gas-discharging duct, it can no longer get back into the same gas-discharging duct, for instance through a barrier in a form similar to a flap, for instance fastened to the end of a duct, to the end of a gas-discharging element, or to the intake aperture on the hollow profile.

The battery cells have preferably been connected to busbars in electrically conducting manner. Several, for instance, each four, battery cells are preferably in contact with a common busbar. The busbars preferentially exhibit apertures that enable the passage of emerging gas from the battery cells to the gas-discharging elements through the busbars.

The gas-discharging elements are preferentially formed by cooling plates or cooling-plate extensions, preferably by bent-over edges of cooling plates or cooling-plate extensions, in particular, by edges that have been bent upwards by 90 degrees. A cooling can consequently also take place at the gas-discharging elements.

The ends of the gas-discharging elements assigned to the battery cells are preferably situated in the region of the narrow sides of the battery cells. A barrier plate, in particular, a cooling plate, has preferably been arranged on at least one long side of the battery cells or on both long sides of the battery cells, so that emerging gas is substantially conducted to the narrow sides of the battery cells and consequently to the gas-discharging elements.

The hollow profile may be a part of the supporting structure of the motor vehicle or may be an individual, separate component in addition to the supporting structure.

The hollow profile preferably extends as far as the rear end of the motor vehicle to at least one outlet aperture, preferentially to two or more outlet apertures, that is to say, venting plugs.

The battery cells are preferably pouch cells or prismatic battery cells and have preferably been incorporated directly into the motor vehicle without a battery housing.

DRAWINGS

Embodiments will be illustrated by way of example in the drawings and explained in the description hereinbelow.

DESCRIPTION

Figure 1A:
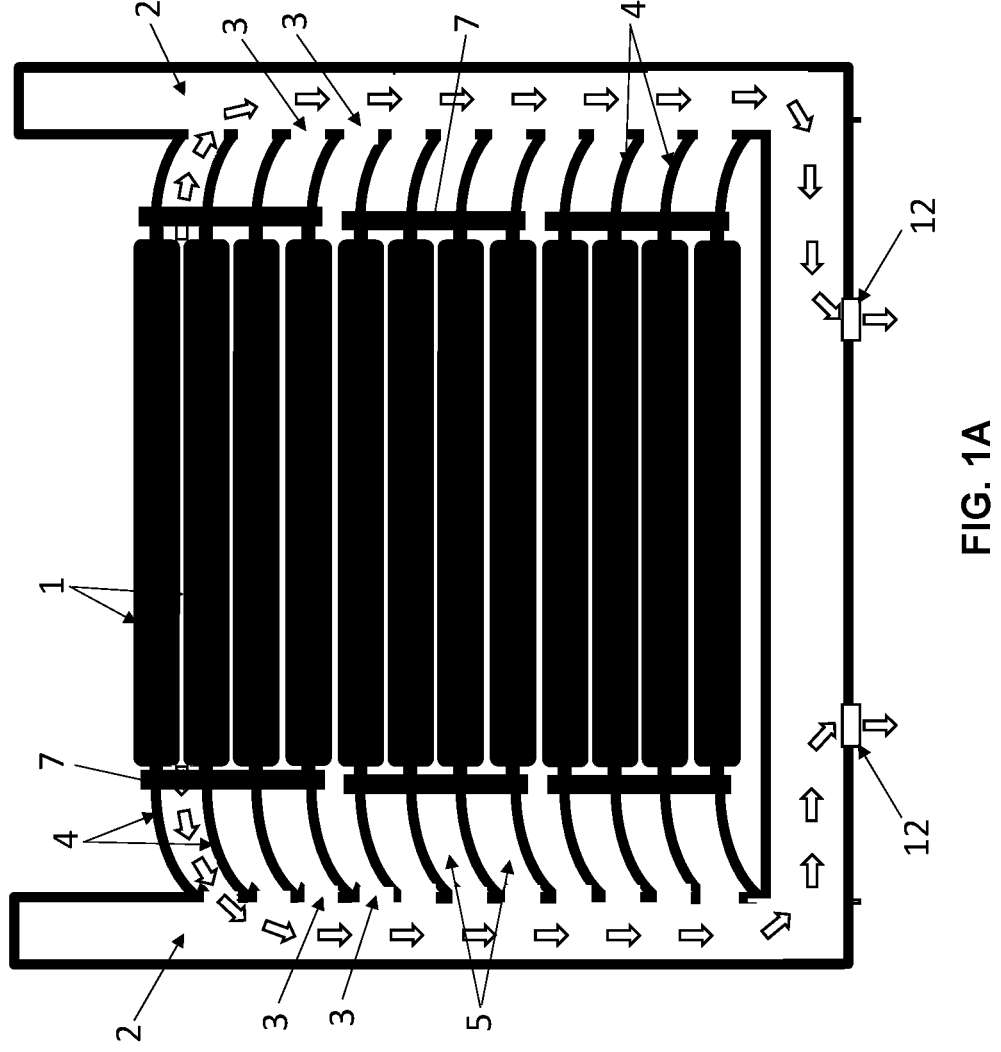
FIG. 1A illustrates a schematic representation of essential parts of a motor vehicle with an arrangement of the battery cells over the entire width of a vehicle, in accordance with one or more embodiments.
Figure 1B:
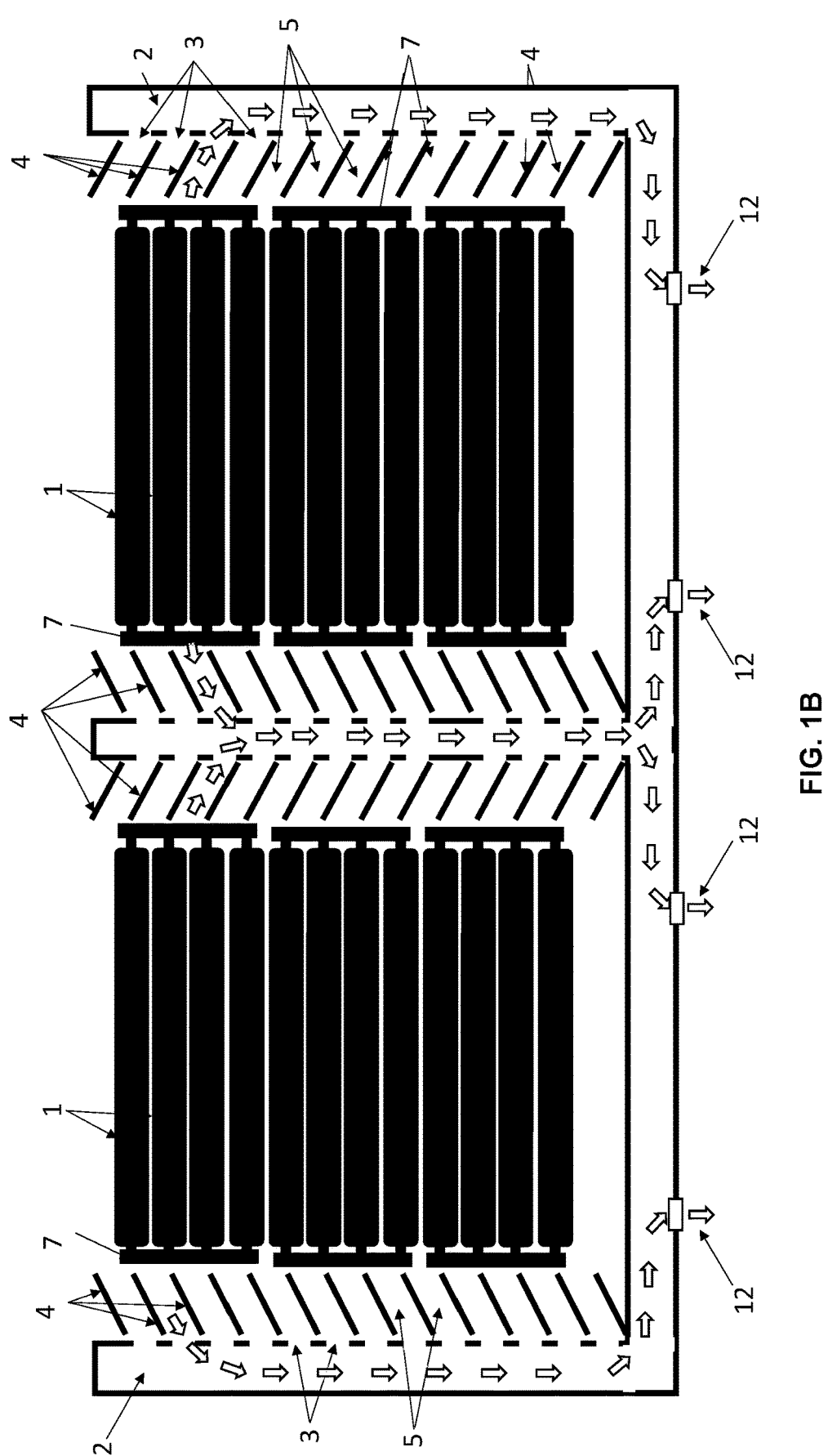
FIG. 1B illustrates a schematic representation of essential parts of a motor vehicle with battery cells which have each been arranged only over approximately half the width of a motor vehicle, with an additional hollow profile in the middle, in accordance with one or more embodiments.

In accordance with one or more embodiments, FIGS. 1A and 1B illustrate parts of a motor vehicle represented schematically. The motor vehicle includes a battery which comprises a plurality of battery cells 1, namely pouch cells. The pouch cells have been incorporated directly into the motor vehicle. Along the sides and the rear end of the motor vehicle in the direction of travel there extends a hollow profile 2 which is in one piece or composed of several parts and which, for example, may pertain partially to the supporting structure of the motor vehicle.

Above all, in the case of relatively short cells, further ducts or hollow profiles 2 may be provided between the battery cells 1 in the elongated extent thereof, as represented in FIG. 1B. Also in this case, the hollow profile 2 which is in one piece or composed of several parts may consist of additional components and/or may have been formed by making use of the frame components, exhibiting cavities, that have usually already been incorporated within the vehicle, such as, for instance, side members, cross members, or sills. The hollow profile 2 exhibits a plurality of intake apertures 3, namely, for instance, depending upon the arrangement, about as many as there are battery cells 1, or about half as many or about twice or four times as many.

In order not to weaken the frame structure too much, it is also conceivable to arrange in the vehicle an additional hollow profile 2 which exhibits the plurality of intake apertures 3 and which has been arranged appropriately close to the battery cells 1, and the connection to the frame components 2, exhibiting a cavity, usually already arranged in the vehicle, such as, for instance, side members, cross members, sills etc., has been formed only at a few points via which the further routing of the gas through the vehicle towards the rear then takes place.

A plurality of gas-discharging elements 4 have been arranged on the plurality of battery cells 1 in such a way that gas emerging from the battery cells 1 is conducted by the gas-discharging elements 4 into the intake apertures 3 of the hollow profile 2. Consequently, for each battery cell 1 a separate intake aperture 3 and a gas-discharging element 4 and a duct 5 have substantially been provided, preferably in each instance on the left and on the right of each battery cell 1. More precisely, the discharge of the gas is affected for a certain battery cell 1 and/or for two adjoining battery cells 1, preferentially in each case through one duct 5 which is formed between each two gas-discharging elements 4, for instance on the left and on the right of each battery cell 1.

FIG. 1A shows equally many gas-discharging elements as the number of cells for the left and right cell sides, in which case the uppermost and lowest cells on the cell half bordering the outside each exhibit no gas-discharging duct and no gas-discharging element otherwise required for this.

In contrast, FIG. 1B shows in this regard additional gas-discharging elements 4 at the top and at the bottom of each cell side, so that the outermost cells 1 of the cell stack also exhibit a gas-discharging duct on the outward-directed cell half in the event of outgassing. In this respect, in a design as in FIG. 1B there are more precisely two gas-discharging elements 4 more per left and right cell side than the number of cells, or twice as many gas-discharging elements per cell block as cells plus four gas-discharging elements. The stipulation "substantially" for the number of gas-discharging elements encompasses such marginal effects.

In general, at least two gas-discharging elements 4 are present, in order to generate a duct 5 for a battery-cell side; to this extent, there are usually substantially equally many gas-discharging elements 4 as battery cells 1 either on one side or on both sides (see FIG. 1A). This may encompass the case where at least one or two gas-discharging elements 4 more than battery cells 1 are employed (see FIG. 1B).

Via the hollow profile 2, the gas is conducted through the vehicle towards the rear, for instance to two or four outlet apertures 12. The outflow of venting gases out of the vehicle frame is preferably affected through venting plugs as outlet apertures 12 which open an aperture into the open air at a defined pressure. These venting plugs also prevent the ingress of moisture and extraneous substances into the vehicle frame. Depending on the outflow capacity of the chosen venting plugs and on the possible routing of gas in the vehicle frame, several outflow points are realised, in order to ensure a dissipation. The motion of the discharged, outflowing gas has been sketched in the figures by arrows in each instance.

The gas-discharging elements 4 are of curved (FIG. 1B) or rectilinear (FIG. 1B) design, and an angle between a respective gas-discharging element 4 and the hollow profile 2 in the region of the intake aperture 3 amounts to about 45 degrees. As a result, gas emerging from the battery cells 1 is conducted by the gas-discharging elements 4 into the intake apertures of the hollow profile 2 in a specified direction, so that the evacuation of the gas in the direction of the longitudinal extent of the hollow profile 2 is facilitated. The gas-discharging elements 4 are preferably designed mechanically in such a way that mechanical forces are not transmitted, or are transmitted as little as possible, to the cells 1 in the event of a crash. The gas-discharging elements 4 have been arranged substantially parallel to one another, and ducts 5 are formed between each two gas-discharging elements 4 for the purpose of routing escaping gas to the intake apertures 3.

The battery cells 1 are consequently preferably incorporated directly into the vehicle, individually or preferably in groups, in accordance with a cell-to-chassis vehicle concept. This concept is also designated as "cell-to-car," "cell-to-vehicle," as well as "structural battery." Various types of cell exhibit various possible points at which they emit gas in the case of a thermal event, in which connection pouch cells do not exhibit a well-defined preferential direction. From all these possible outgassing points in the pouch cell, it is necessary to conduct emerging venting gases away from the cell into the exterior space. This is affected in a manner directed by the gas-discharging elements 4 as gas-routing components, so that the cells alongside the first outgassing cell are heated up less and so are brought into the state of thermal propagation only later (or not at all). The discharge is preferably affected through ducts in hollow profiles 2 of the vehicle frame.

Figure 2:
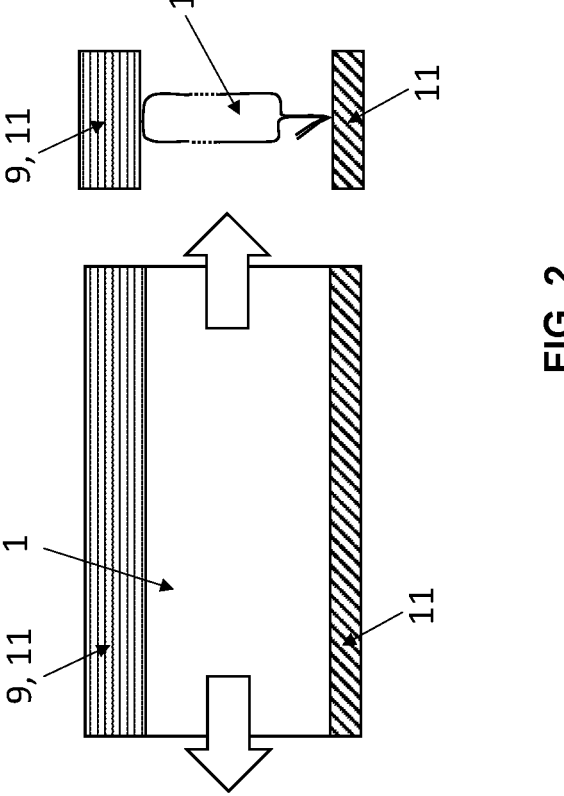
FIGS. 2A and 2B illustrate the environment of a battery cell of a motor vehicle from a side view (on the left) and from a front view (on the right), in accordance with one or more embodiments.

The ends of the gas-discharging elements 4 assigned to the battery cells 1 are situated on narrow sides of the battery cells 1. As represented in FIG. 2, barrier plates 11, for instance, formed on one side by a cooling plate 9, have been arranged on long sides of the battery cells 1, so that emerging gas is conducted substantially to the narrow sides of the battery cells 1.

An outflow in the direction of the long sides of the pouch cell is suppressed, on the one hand, by the envelope region of the pouch foil, situated on sides of the cell cooling 9, and on the other hand by a barrier layer 11 directly adjoining the cell stack 1, for example a mica composite plate, is deflected and preferably flows to the sides where the busbars 7 and terminals 13 are generally also situated (see FIG. 3). That is to say, as a result of linking of the cooling plate 9 and of a barrier layer 11 of reinforced construction on the opposite long side, venting gas is dissipated primarily on sides of the terminals 13 and busbars 7.

Figures 3A, 3B, 4:
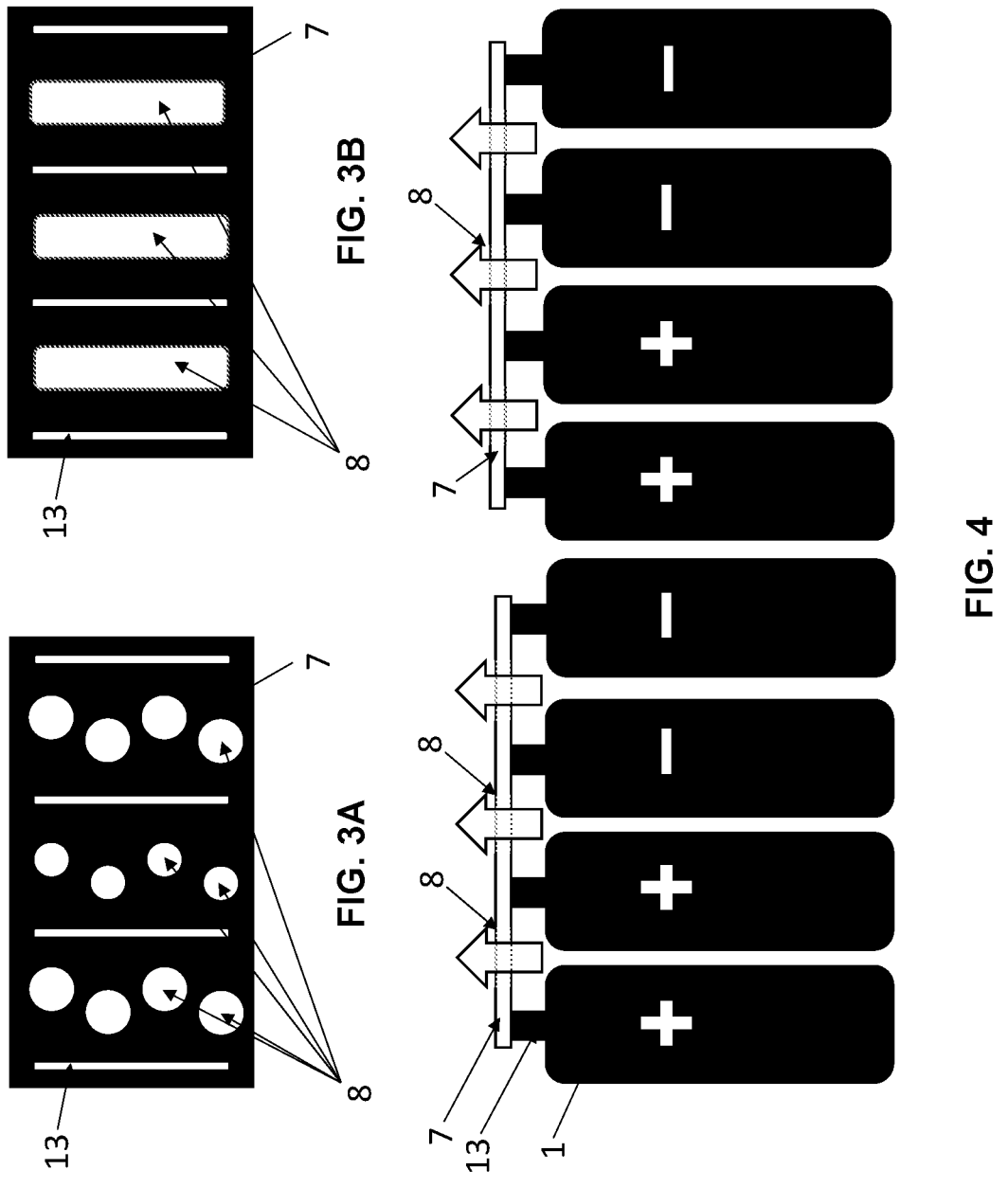
FIGS. 3A and 3B illustrate views of a busbar of a motor vehicle with various exemplary aperture geometries.
FIG. 4 illustrates schematically a top view of the busbar with underlying battery cells of FIG. 3A or 3B.

As represented in FIGS. 3A, 3B, and 4, the battery cells 1 have been connected to busbars 7 in electrically conducting manner via terminals 13, the busbars 7 exhibiting apertures 8 for the passage of emerging gas from the battery cells 1 to the gas-discharging elements 4. The apertures 8 may, for instance, be round (FIG. 3A) or may, for instance, be elongated holes (FIG. 3B) and may, for instance, extend over a relatively large region of the interspace between two terminals 13. In the case of contiguous pouch cells that have been connected by busbars 7 or connected in parallel, the lateral outflow of venting gas through the busbars 7 is disturbed or prevented. Here, a thicker busbar 7 should be employed which permits the outflow of venting gas away from the cell cluster through holes 8 in the busbar 7, and nevertheless still exhibits sufficient conductor cross-section.

Figure 5:
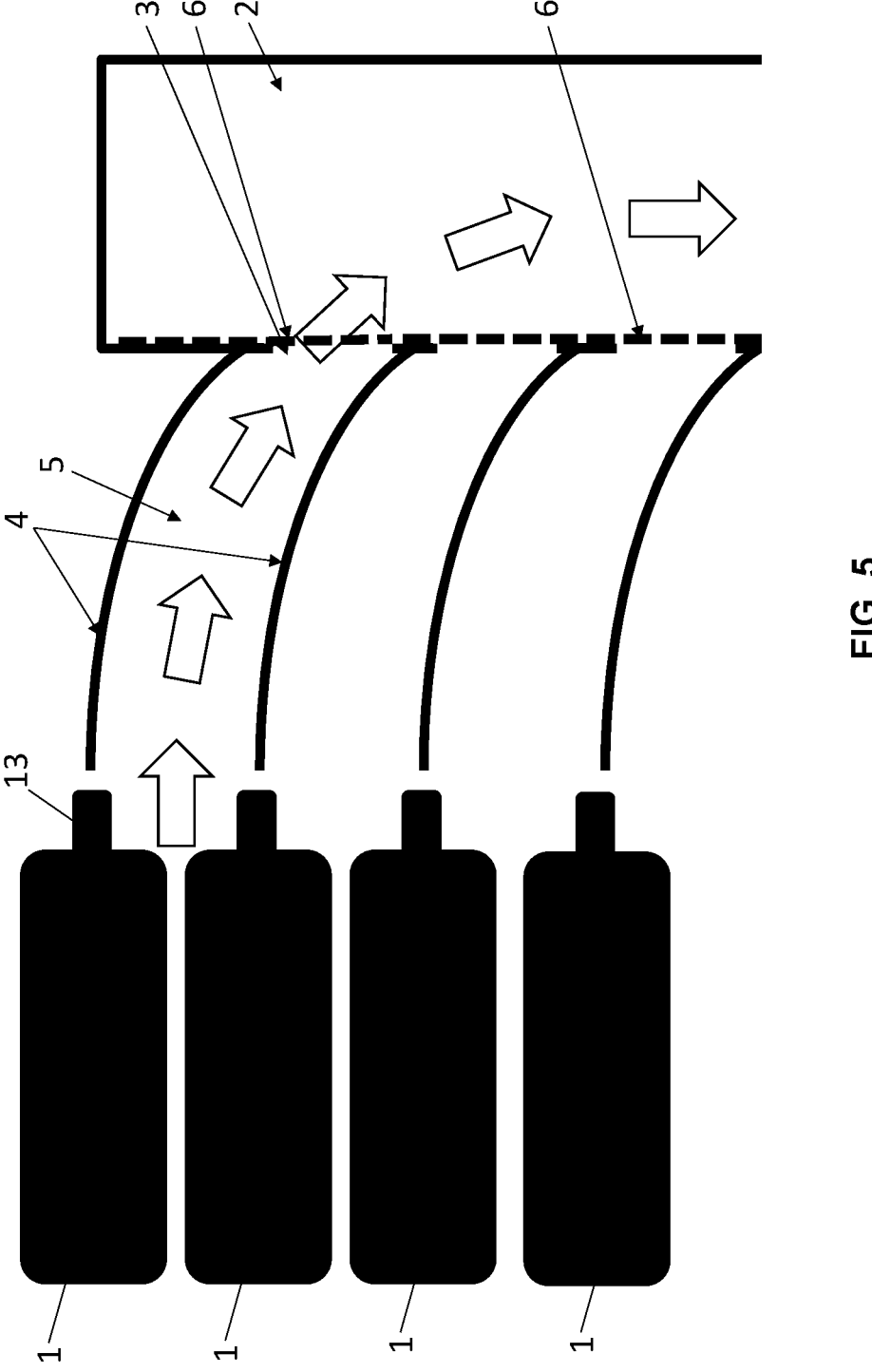
FIG. 5 illustrates schematically a section of FIG. 1 in more detail.

FIG. 5 shows that at each of the intake apertures 3 a barrier 6, in particular, a flap, a semipermeable membrane or thermally destructible material, has been set up which enables the passage of gas emerging from a battery cell 1 into the hollow profile 2 and impedes or prevents the passage of gas out of the hollow profile 2 to the same and/or to another gas-discharging element 4 or to the same and/or to another gas-discharging duct 5.

The gas-discharging elements 4 have been designed in such a way that they resist, mechanically and thermally, the outgassing of a single cell. After it has passed through the busbars 7, the hot gas has to be conducted in the direction of the intake apertures 3 in the dissipation duct 5. In this connection, the primary objective is to heat up the neighbouring cells as little as possible. This is achieved by wall sections that are inclined by about 45° to the longitudinal axes of the cells, or that are similarly shaped.

The backflow out of the vehicle frame or hollow profile 2 to other neighbouring cells 1 has to be inhibited. This is achieved by the shaping of the gas-discharging elements 4 that have been represented in FIG. 5. Alternatively or additionally, use may also be made of barriers 6 which in the case of a thermal event are penetrated, preferably thermally destroyed, directly at the cell 1 but which continue to inhibit the flow of gas at a sufficient distance from the outgassing cell 1.

Figure 6:
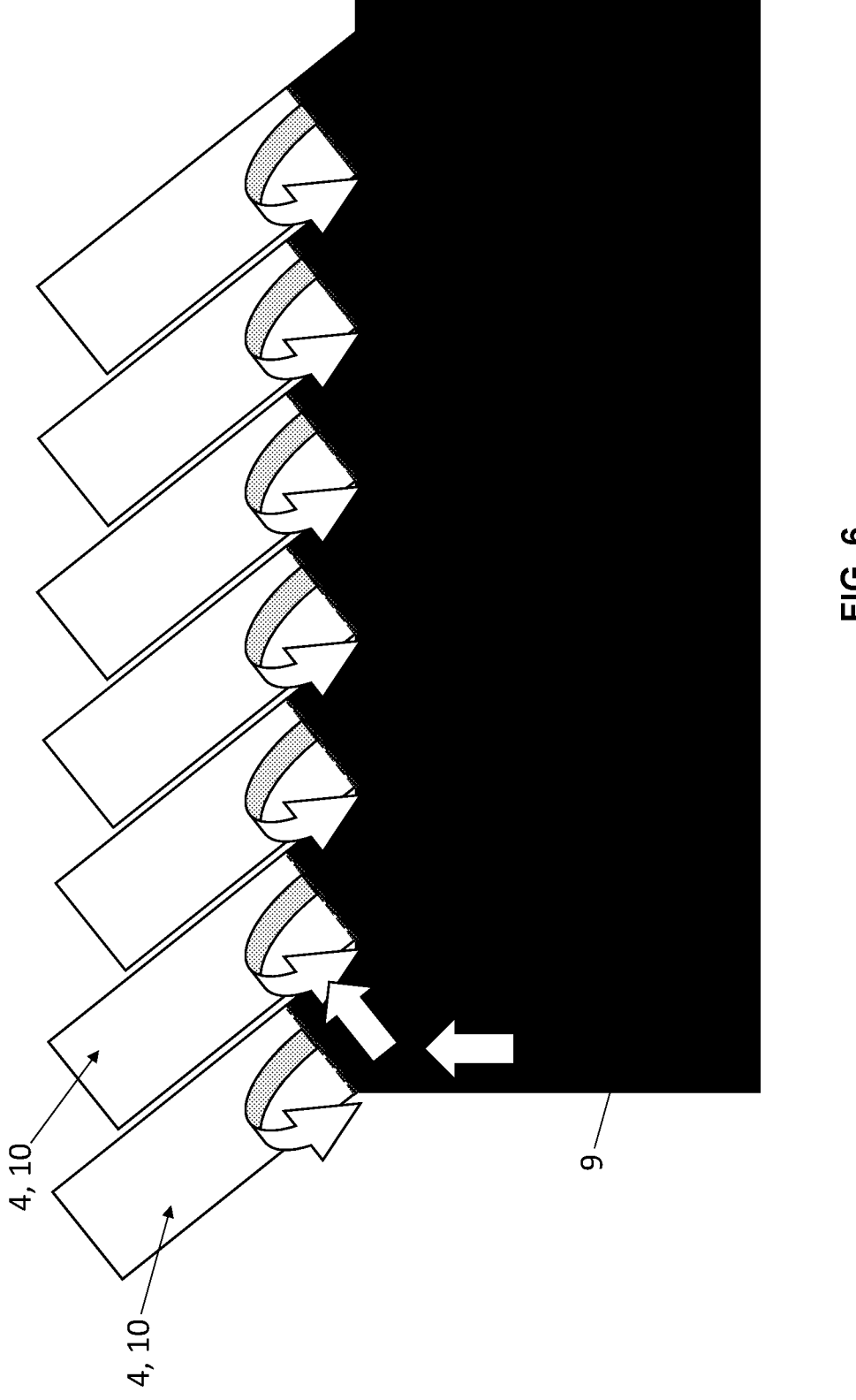
FIG. 6 illustrates schematically a cooling plate which has been extended to form gas-discharging elements for a motor vehicle, in accordance with one or more embodiments.

As represented in FIG. 6, the gas-discharging elements 4 may be formed by cooling plates 9 or cooling-plate extensions 10, that is to say, prolongations on a cooling plate 9, preferably by bent-over edges of the cooling plates 9, namely of the cooling-plate extensions 10.

The terms "coupled," "attached," or "connected" may be used herein to refer to any type of relationship, direct or indirect, between the components in question, and may apply to electrical, mechanical, fluid, optical, electromagnetic, electromechanical, or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 battery cell
2 hollow profile
3 intake aperture
4 gas-discharging element
5 duct
6 barrier
7 busbar
8 aperture
9 cooling plate
10 cooling-plate extension
11 barrier plate
12 outlet aperture
13 terminal

What is claimed is:

1. A motor vehicle, comprising:

a battery having a plurality of battery cells;

a vehicle frame comprising at least one hollow profile extending along sides of the motor vehicle and having a plurality of intake apertures and along a rear end of the motor vehicle with at least one outlet aperture; and a plurality of gas-discharging elements arranged on the plurality of battery cells to guide a flow of gas emerging from the battery cells through the intake apertures into the at least one hollow profile for discharge at the at least one outlet aperture, wherein an angle between each gas-discharging element and the hollow profile in a region of the intake aperture is less than 70 degrees to directly guide the flow of the gas emerging from the battery cells into the intake apertures in a specified direction.

2. The motor vehicle of claim 1, wherein the angle between a respective gas-discharging element and the hollow profile in a region of the intake aperture is less than 50 degrees.

3. The motor vehicle of claim 2, wherein the angle between a respective gas-discharging element and the hollow profile in a region of the intake aperture is less than 50 degrees to facilitate an evacuation of the gas in a longitudinal direction of the of the hollow profile.

4. The motor vehicle of claim 3, wherein the gas-discharging elements have a curved cross-section extending between the battery cells and the intake apertures.

5. The motor vehicle of claim 1, wherein the gas-discharging elements and the intake apertures respectively corresponds in number to a number of battery cells.

6. The motor vehicle of claim 1, wherein the gas-discharging elements and the intake apertures respectively corresponds in number to half a number of battery cells.

7. The motor vehicle of claim 1, wherein the gas-discharging elements are arranged substantially parallel to one another.

8. The motor vehicle of claim 7, wherein adjacent gas-discharging elements define ducts for routing escaping gas to the intake apertures.

9. The motor vehicle of claim 1, further comprising a flap formed of a semipermeable membrane or thermally destructible material arranged at each of the intake apertures, the flap enabling the flow of gas emerging from the battery cells into the hollow profile while impeding a flow of the gas out of the hollow profile to a gas-discharging element and/or to a gas-discharging duct.

10. The motor vehicle of claim 1, further comprising busbars connected to the battery cells in an electrically conducting manner, the busbars having apertures to facilitate a flow of the emerging gas from the battery cells to the gas-discharging elements.

11. The motor vehicle of claim 1, wherein the gas-discharging elements are formed by cooling plates or cooling-plate extensions.

12. The motor vehicle of claim 1, wherein the ends of the gas-discharging elements assigned to the battery cells are situated on narrow sides of the battery cells.

13. The motor vehicle of claim 12, further comprising a barrier plate, serving as a cooling plate, arranged on at least one long side of the battery cells, to facilitate the flow of the emerging gas to the narrow sides of the battery cells.

14. The motor vehicle of claim 1, wherein the battery cells comprise pouch cells.

15. The motor vehicle of claim 1, wherein the battery cells comprise prismatic battery cells.

16. The motor vehicle of claim 1, wherein the battery cells are incorporated directly into the motor vehicle without a battery housing.

17. The motor vehicle of claim 1, wherein the frame component comprises a sill, a side member, a cross member, or combinations thereof.

18. A motor vehicle, comprising: a vehicle frame component having at least one hollow profile extending along a side of the motor vehicle with a plurality of intake apertures and extending along a rear end of the motor vehicle with at least one outlet aperture; a battery having a plurality of battery cells supported on the frame component; and a plurality of gas-discharging elements arranged adjacent to the battery cells to guide a flow of gas from the battery cells through the intake apertures into the at least one hollow profile for discharge at the at least one outlet aperture, wherein an angle between each gas-discharging element and the hollow profile in a region of the intake aperture is less than 70 degrees to directly guide the flow of the gas emerging from the battery cells into the intake apertures in a specified direction.

19. The motor vehicle of claim 18, wherein the frame component comprises a sill, a side member, a cross member, or combinations thereof.

20. A motor vehicle, comprising: a battery having a plurality of battery cells; a vehicle frame having a side hollow profile extending longitudinally along a side of the motor vehicle in a direction of travel of the motor vehicle, and a rear hollow profile, connected to the side hollow profile, extending laterally along a rear end of the motor vehicle in the direction of travel of the motor vehicle, the side hollow profile having a plurality of intake apertures and the rear hollow profile having at least one outlet aperture; and a plurality of gas-discharging elements extending between the battery cells and the intake apertures such that neighboring gas-discharging elements define a duct that guides a flow of gas from the battery cells through the intake apertures for discharge at the rear end of the motor vehicle at the least one outlet aperture, wherein an angle between each gas-discharging element and the side hollow profile in a region of the intake aperture is less than 70 degrees to directly guide the flow of the gas emerging from the battery cells into the intake apertures in a specified direction.

\* \* \* \* \*